United States Patent
Kitahara et al.

(10) Patent No.: US 9,292,984 B2
(45) Date of Patent: Mar. 22, 2016

(54) WIRELESS COMMUNICATION SYSTEM BETWEEN A VEHICLE AND A PORTABLE DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Takahide Kitahara, Kariya (JP); Ryuta Atsumi, Toyota (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 30 days.

(21) Appl. No.: 14/366,636

(22) PCT Filed: Dec. 13, 2012

(86) PCT No.: PCT/JP2012/082983
§ 371 (c)(1),
(2) Date: Jun. 18, 2014

(87) PCT Pub. No.: WO2013/094661
PCT Pub. Date: Jun. 27, 2013

(65) Prior Publication Data
US 2015/0002264 A1    Jan. 1, 2015

(30) Foreign Application Priority Data
Dec. 19, 2011  (JP) .................. 2011-277015

(51) Int. Cl.
G07C 9/00  (2006.01)
B60R 25/24  (2013.01)
H04W 24/08  (2009.01)

(52) U.S. Cl.
CPC .......... *G07C 9/00007* (2013.01); *B60R 25/245* (2013.01); *G07C 9/00309* (2013.01); *H04W 24/08* (2013.01); *G07C 2009/00769* (2013.01)

(58) Field of Classification Search
USPC ....................................................... 360/5.61
See application file for complete search history.

(56) References Cited

U.S. PATENT DOCUMENTS 6,965,295 B2 * 11/2005 Shimonomoto ...... B60R 25/246
340/10.34
7,206,615 B2 * 4/2007 Ochi ..................... B60R 25/245
455/41.2

(Continued)

FOREIGN PATENT DOCUMENTS

DE   10206774 A1   8/2003
EP    1508886 A2   2/2005

(Continued)

OTHER PUBLICATIONS

International Search Report and Written Opinion of the ISA for PCT/JP2012/082983, ISA/JP, mailed Mar. 5, 2013.

(Continued)

*Primary Examiner* — Brian Miller
(74) *Attorney, Agent, or Firm* — Harness, Dickey & Pierce, P.L.C.

(57) ABSTRACT

In a wireless communication system, an approach determination section determines whether a portable device is inside of a nearby area of one of a plurality of transmitting antennas transmitting a primary signal. When the approach determination section determines that the portable device is inside of the nearby area, a transmission control section changes a driving voltage of another one of the transmitting antennas disposed outside of the nearby area, such that a communication area of the another one of the transmitting antennas is increased to encompass the nearby area of the one of the transmitting antennas, and the primary signal is retransmitted from the another one of the transmitting antennas.

5 Claims, 11 Drawing Sheets

(56) References Cited

U.S. PATENT DOCUMENTS

| | | | | |
|---|---|---|---|---|
| 7,375,440 B2* | 5/2008 | Suyama | ................. | B60R 25/00 307/10.2 |
| 7,629,876 B2* | 12/2009 | Nagai | ..................... | B60R 25/24 340/426.13 |
| 8,120,474 B2* | 2/2012 | Fujioka | .............. | B60C 23/0408 340/426.13 |
| 8,207,817 B2* | 6/2012 | Kamiya | ............ | G07C 9/00309 340/5.7 |
| 8,423,203 B2* | 4/2013 | Takeuchi | ................ | B60R 25/24 701/2 |
| 8,872,620 B2* | 10/2014 | Higemoto | ............... | B60R 25/24 340/426.13 |
| 8,907,762 B2* | 12/2014 | Kawamura | ............ | B60R 25/245 340/426.36 |
| 2006/0208855 A1* | 9/2006 | Okada | ................... | B60R 25/245 340/5.72 |
| 2007/0165553 A1 | 7/2007 | Steinmann | | |
| 2007/0216517 A1* | 9/2007 | Kurpinski | ............ | B60R 25/245 340/5.72 |
| 2012/0139691 A1* | 6/2012 | Mori | ....................... | B60R 25/24 340/5.2 |
| 2015/0002264 A1* | 1/2015 | Kitahara | ............ | G07C 9/00309 340/5.61 |

FOREIGN PATENT DOCUMENTS

| | | |
|---|---|---|
| JP | 3659583 B2 | 6/2005 |
| JP | 2008-240315 A | 10/2008 |
| JP | 4366376 B2 | 11/2009 |
| WO | WO-2007/095891 A1 | 8/2007 |

OTHER PUBLICATIONS

Office Action mailed Sep. 1, 2015 in the corresponding RU Application No. 2014129524 with English translation.

* cited by examiner

BIT MISSING

WIRELESS COMMUNICATION SYSTEM BETWEEN A VEHICLE AND A PORTABLE DEVICE

CROSS REFERENCE TO RELATED APPLICATION

This application is a 371 U.S. National Phase of PCT/JP2012/082983, filed on Dec. 13, 2012, which is based on Japanese Patent Application No. 2011-277015 filed on Dec. 19, 2011, the disclosures of which are incorporated herein by reference.

TECHNICAL FIELD

The present disclosure relates to a wireless communication system that performs wireless communication between an in-vehicle unit and a portable device.

BACKGROUND ART

An electronic key system for a vehicle that controls a door locking operation and an engine starting operation based on a result of wireless communication between an in-vehicle unit and a portable device, such as an electronic key, has been known. Such an electronic key system is described in patent citations JP 3659583 B2, JP 2008-240315 and JP 4366376 B2.

In such an electronic key system, a request signal (primary signal) is transmitted from a transmitting antenna disposed in a vehicle to a communication area provided inside or outside of a passenger compartment. When the portable device is inside of the communication area, the portable device transmits a response signal (secondary signal) to the in-vehicle unit in response to the request signal. When the response signal satisfies a predetermined condition, the in-vehicle unit performs a predetermined operation, such as a door unlocking operation.

As described in the patent citation 1, transmitting antennas are disposed at different positions of a vehicle, such as doors, a center console and rear seats. Each of the transmitting antennas provides a communication area such that the communication areas do not overlap with each other. In particular, a communication area provided by an interior transmitting antenna and a communication area provided by an exterior transmitting antenna are adjusted not to overlap with each other.

With regard to systems described in the patent citations 2 and 3, a portable device has a function of measuring an intensity of a request signal, such as a received signal strength indication (RSSI) value and a radio field intensity, transmitted from a vehicle. Further, with regard to the system of the patent citation 2, the portable device transmits a response signal including the RSSI value measured to an in-vehicle unit, and the in-vehicle unit restricts a relay attack based on the RSSI value of the response signal.

Figure 12:
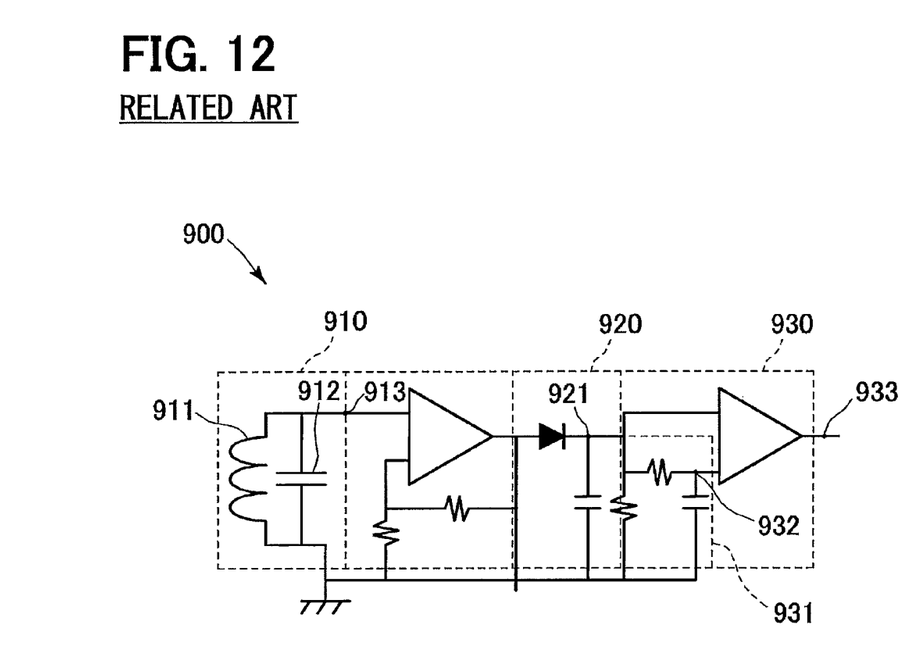
FIG. 12 is a circuit diagram of a receiving circuit of a portable device according to a related art.

FIG. 12 is a diagram of a receiving circuit 900 employed in such a portable device for receiving a request signal. Also, FIG. 5A illustrates a change of a demodulated waveform of the request signal at respective portions of the receiving circuit 900 when the portable device is distant from a transmitting antenna, and FIG. 5B illustrates a change of the demodulated waveform of the request signal at the respective portions of the receiving circuit 900 when the portable device is near the transmitting antenna.

The receiving circuit 900 includes a receiving part 910, a demodulating part 920 and a waveform shaping part 930. The receiving part 910 includes an antenna coil 911 and a capacitor 912 to form a resonance circuit. The demodulating part 920 performs an envelope demodulation of a waveform received at the receiving part 910. The waveform shaping part 930 shapes the envelope-demodulated waveform into a binary signal. The waveform shaping part 930 includes a threshold setting circuit 931. The waveform shaping part 930 outputs a signal indicting a high level or a low level, that is, the binary signal, by comparing a value of the envelope-demodulated waveform to a threshold. Also, the threshold setting circuit 931 serves as a low-pass filter that moderates the envelope-demodulated waveform. The threshold is provided by an output of the low-pass filter.

Figure 5A:
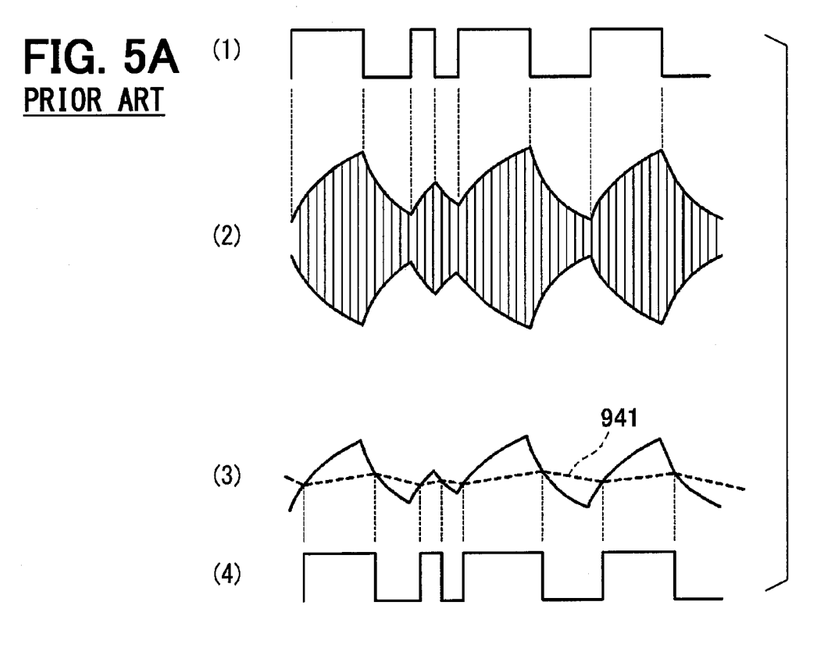
FIG. 5A is a waveform chart when a portable device is distant from the transmitting device, in which (1) is a base-band waveform of a request signal, (2) is a waveform received in the portable device; (3) is an envelope-demodulated waveform, and (4) is a demodulation waveform.
Figure 5B:
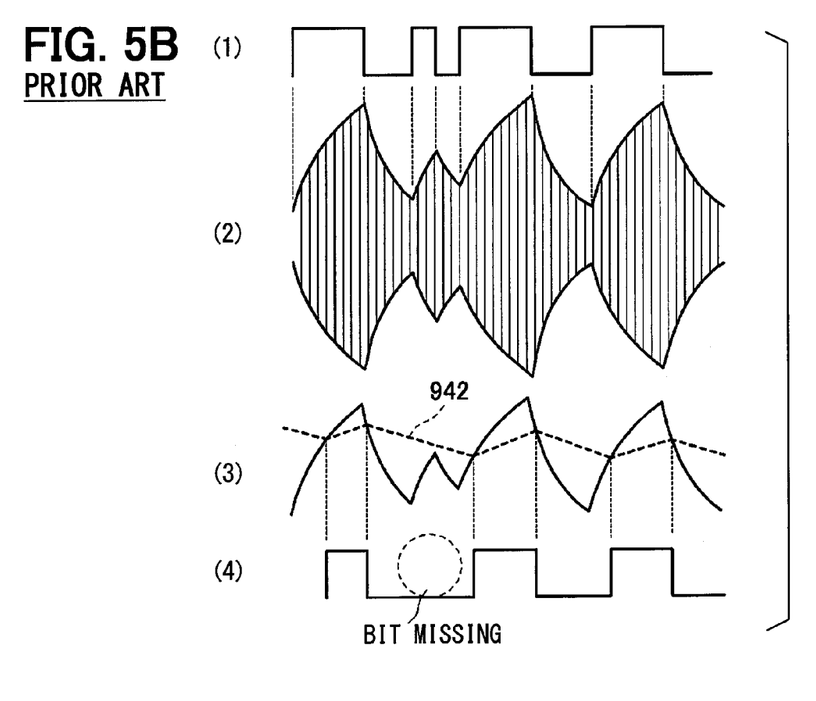
FIG. 5B is a waveform chart when the portable device is near the transmitting device, in which (1) is a base-band waveform of a request signal, (2) is a waveform received in the portable device; (3) is an envelope-demodulated waveform, and (4) is a demodulation waveform.

In FIGS. 5A and 5B, (1) illustrates a base-band waveform of the request signal, and (2) illustrates a waveform at an output point 913 of the receiving part 910. Also, (3) illustrates a waveform at an output point 921 of the demodulating part 920, and (4) illustrates a waveform (demodulation waveform) at an output point 933 of the waveform shaping part 930. Further, dashed lines 941, 942 of (3) of FIGS. 5A and 5B illustrate a change of the threshold set in the threshold setting circuit 931, that is, a value at an output point 932.

As shown in (2) of FIGS. 5A and 5B, rising and falling of the waveform received by the receiving part 910 is slowed relative to the base-band waveform of the request signal shown in (1) of FIGS. 5A and 5B due to an effect of antenna Q value of the antenna coil 911. An intensity of the electric field generated from the transmitting antenna changes in inverse proportion to the cube of a distance. Therefore, when the portable device is near the transmitting antenna, the portable device necessarily receives a very strong radio wave, as shown in (2) of FIG. 5B.

In this case, the threshold cannot follow a change of the envelope-demodulated waveform in a section due to an increase in an amplitude of the envelope-demodulated waveform and an influence of a time constant of the threshold setting circuit 931, as shown in (3) of FIG. 5B. As a result, the demodulation waveform misses a bit, as shown in (4) of FIG. 5B.

Accordingly, in a system where the threshold is set based on the waveform slowed due to the antenna Q value of the portable device and/or the envelope-demodulated waveform, when the portable device is located near the transmitting antenna, it is difficult to properly receive the request signal in the portable device.

Patent Citation 1: Japanese Patent No. 3659583 B2
Patent Citation 2: Japanese Patent Application Publication No. 2008-240315
Patent Citation 3: Japanese Patent No. 4366376 B2

SUMMARY

It is an object of the present disclosure to provide a wireless communication system which enables a portable device to properly receive a primary signal from an in-vehicle unit, even if the portable device is located near a transmitting antenna.

According to an aspect of the present disclosure, a wireless communication system includes a plurality of transmitting antennas, a portable device, a transmission control section, and an approach determination section. The transmitting antennas are disposed at different positions of a vehicle. Each of the transmitting antennas transmits a primary signal to a communication area according to a driving voltage thereof. The portable device receives the primary signal when the portable device is inside of the communication area. The transmission control section is integrated to the vehicle and controls the driving voltage of each of the transmitting antennas, to transmit the primary signal from each of the transmitting antennas. The approach determination section is integrated to the vehicle and determines whether the portable device is inside of a nearby area of one of the transmitting antennas transmitting the primary signal. When the approach determination section determines that the portable device is inside of the nearby area, the transmission control section changes the driving voltage of another one of the transmitting antennas such that the communication area of the another one of the transmitting antennas is increased to encompass the nearby area of the one of the transmitting antennas and the primary signal is retransmitted from the another one of the transmitting antennas.

In the wireless communication device described above, when the portable device is inside of the nearby area of the one of the transmitting antenna, the primary signal is retransmitted from the another transmitting antenna distant from the nearby area to the increased communication area. Therefore, the portable device receives the primary signal transmitted from the another one of the transmitting antennas located outside of the nearby area. Accordingly, the portable device properly receives the primary signal.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, embodiments of the present disclosure will be described with reference to the drawings.

Figure 1:
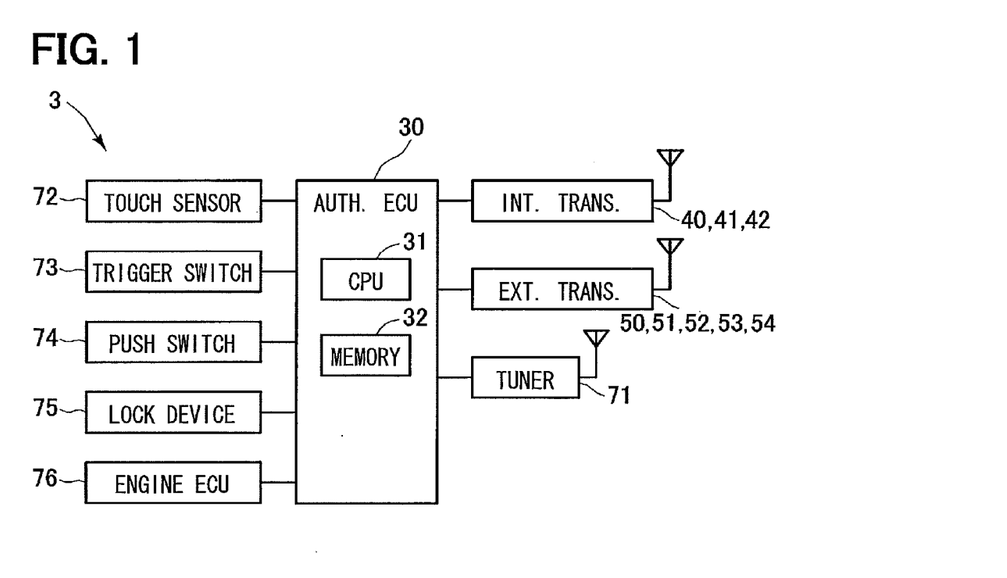
FIG. 1 is a block diagram of an in-vehicle unit of a wireless communication system according to an embodiment of the present disclosure.
Figure 4:
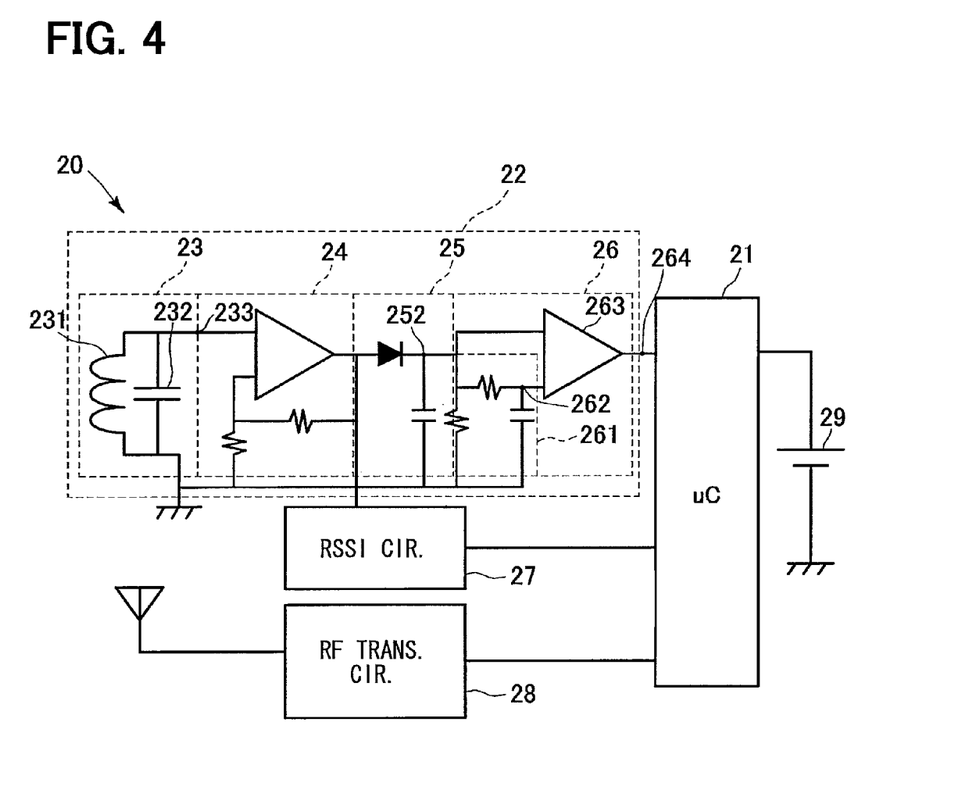
FIG. 4 is a circuit diagram of a portable device of the wireless communication system according to the embodiment.

A wireless communication system according to an embodiment is exemplarily used as a smart entry system (electronic key system). The smart entry system generally performs bidirectional communication between an in-vehicle unit and a portable device (electronic key), and performs a door locking and unlocking operation and an engine starting operation based on a result of the bidirectional communication. As shown in FIGS. 1 and 4, the smart entry system includes an in-vehicle unit 3 mounted in a vehicle, and a portable device 20.

As shown in FIG. 1, the in-vehicle unit 3 includes an authentication electronic control unit (ECU) 30, transmitting devices, such as interior transmitting devices 40 and exterior transmitting devices 50, a tuner 71, a touch sensor 72, a trigger switch 73, a push switch 74, a lock device 75, and an engine electronic control unit (ECU) 76. The authentication ECU 30 is coupled to the interior transmitting devices 40, the exterior transmitting devices 50, the tuner 71, the touch sensor 72, the trigger switch 73, the push switch 74, the lock device 75 and the engine ECU 76.

Figure 3:
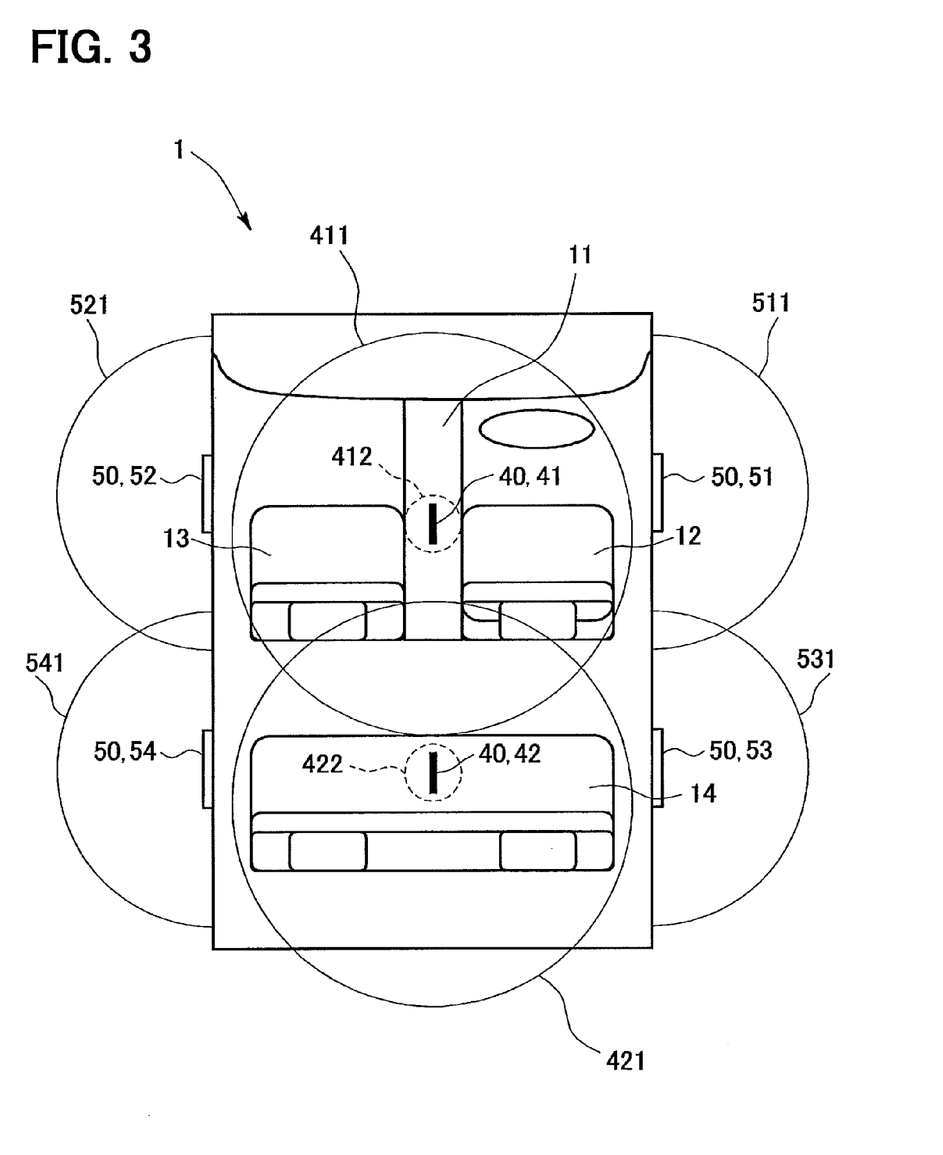
FIG. 3 is a schematic diagram illustrating arrangement positions of transmitting devices in a vehicle according to the embodiment.

As shown in FIG. 3, the interior transmitting devices 40 includes a front interior transmitting device 41 and a rear interior transmitting device 42. The front interior transmitting device 41 is arranged near front seats, such as a driver seat 12 and a front passenger seat 13 in a passenger compartment of a vehicle 1. For example, the front interior transmitting device 41 is arranged in a center console 11 provided between the driver seat 12 and the front passenger seat 13. The front interior transmitting device 41 transmits a request signal to a front interior communication area 411 encompassing a front part of the passenger compartment.

The rear interior transmitting device 42 is arranged near a rear seat 14 in the passenger compartment. For example, the rear interior transmitting device 42 is arranged under the rear seat 14, at a middle position of the rear seat 14 with respect to a vehicle left and right direction. The rear interior transmitting device 42 transmits a request signal to a rear interior communication area 421 encompassing a rear part of the passenger compartment.

The exterior transmitting devices 50 include a front right exterior transmitting device 51 arranged in a front right door, a front left exterior transmitting device 52 arranged in a front left door, a rear right exterior transmitting device 53 arranged in a rear right door, and a rear left exterior transmitting device 54 arranged in a rear left door. For example, each of the exterior transmitting devices 51-54 is arranged in a door handle of the corresponding door. Each of the exterior transmitting devices 51-54 transmits a request signal to a communication area 511, 521, 531, 541 defined outside of the door within a range of approximately 1 m from the corresponding door.

Figure 2:
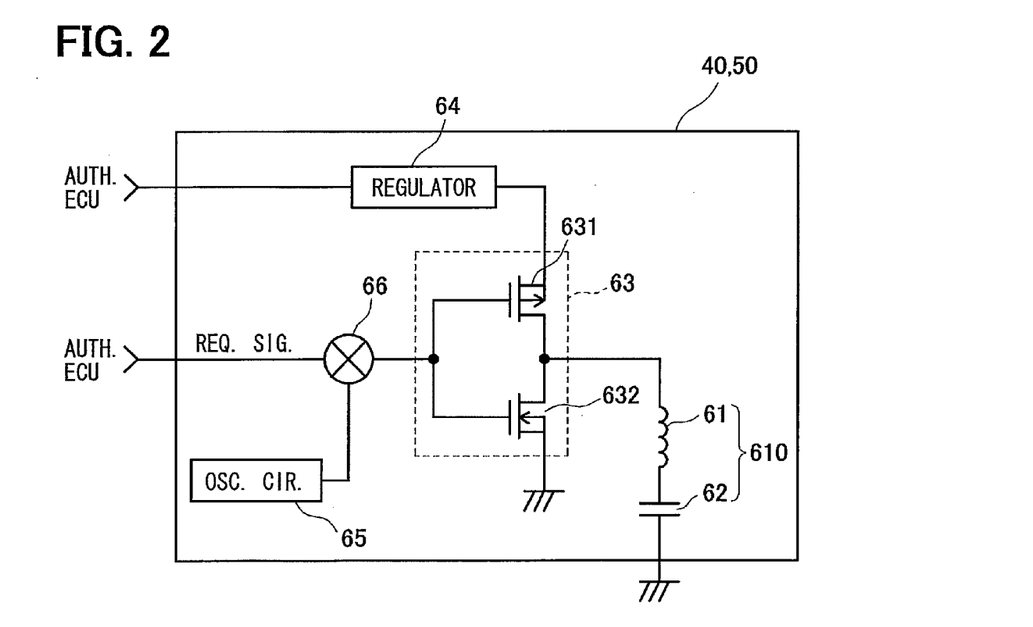
FIG. 2 is a schematic circuit diagram of a transmitting device of the in-vehicle unit according to the embodiment.

Each of the transmitting devices 40, 50 (41, 42, 51-54) has the same structure, as shown in FIG. 2. In particular, the transmitting device 40, 50 includes an antenna coil 61 and a resonance capacitor 62. The antenna coil 61 and the resonance capacitor 62 constitute a resonance circuit 610. The transmitting device 40, 50 further includes a driving circuit 63, a regulator 64, an oscillation circuit 65, and a converter 66. The driving circuit 63 drives the resonance circuit 610. The regulator 64 regulates a driving voltage applied to the resonance circuit 610. The oscillation circuit 65 generates an oscillation signal having a predetermined frequency, such as a frequency in a LF-band. The predetermined frequency is, for example, 134 kilohertz (kHz). The converter 66 converts the request signal outputted from the authentication ECU 30 into a modulation signal, such as by an amplitude shift keying (ASK) modulation, by mixing the request signal and the oscillation signal from the oscillation circuit 65. The driving circuit 63 is a CMOS inverter in which a P-channel MOSFET 631 and an N-channel MOSFET 632 are coupled in a half-bridge manner.

The regulator 64 is configured such that the driving voltage applied to the resonance circuit 610 can be varied in accordance with an instruction from the authentication ECU 30. In a normal operation, that is, when the portable device 20 is not located in a nearby area defined around the transmitting device 40, 50 as a transmitting antenna, the regulator 64 of each transmitting device 40, 50 outputs the driving voltage to form the communication area 411, 421, 511, 521, 531, 541 as shown in FIG. 3.

Next, an operation of the transmitting device 40, 50 will be described.

When the transmitting device 40, 50 receives the request signal in which a high level signal and a low level signal are combined from the authentication ECU 30, the request signal is converted into the modulation signal by the converter 66. The modulation signal is provided to the driving circuit 63.

In the driving circuit 63, the FETs 631, 632 are turned on and off in accordance with the modulation signal. When the FET 631 is in an on state and the FET 632 is in an off state, the resonance circuit 610 is applied with the driving voltage regulated by the regulator 64. When the FET 631 is in an off state and the FET 632 is in an on state, the resonance circuit 610 is grounded. With this, as the resonance circuit 610 performs a resonance operation, an ac current flows in the antenna coil 61. Further, a radio wave according to a frequency of the ac current is transmitted from the antenna coil 61, as a radio wave of the request signal.

The tuner 71 receives a radio wave of a response signal transmitted from the portable device 20. The tuner 71 outputs the response signal to the authentication ECU 30 after demodulation. For example, the radio wave of the response signal transmitted from the portable device 20 has a frequency in an RF-band, such as 300 to 400 MHz band. For example, the tuner 71 is arranged in a pillar, such as a C-pillar, located obliquely behind the rear seat 14.

The touch sensor 72 is disposed on a back side of a door handle of each door. The touch sensor 72 detects that a user touches the rear side of the door handle. For example, the touch sensor 72 is provided by an electrostatic capacity sensor. The touch sensor 72 provides a detection signal to the authentication ECU 30.

The trigger switch 73 is arranged around the door handle to instruct door lock. The trigger switch 73 is, for example, a push switch. When the trigger switch 73 is operated, a signal indicating the operation of the trigger switch 73 is provided to the authentication ECU 30.

The push switch 74 is arranged in an instrument, panel of the vehicle 1. The push switch 74 is provided to instruct to turn on an accessory power supply and an ignition power supply and to instruct the engine starting operation. An operation signal of the push switch 74 is provided to the authentication ECU 30.

The lock device 75 is provided for each of the doors. The lock device 75 includes a door lock motor (not shown) to lock and unlock the door. The engine ECU 76 is provided to control an engine (not shown) of the vehicle 1.

The authentication ECU 30 includes a CPU 31, a memory 32 and the like. The authentication ECU 30 performs various processes regarding the smart entry system. For example, when the vehicle 1 is in a parked state, the authentication ECU 30 intermittently transmits the request signal through the external transmitting devices 50. The request signal includes a command to instruct an operation to the portable device 20, a first challenge code made of random numbers, and an ID code of the portable device 20 as identification information.

The smart entry system may include plural portable devices 20, and each of the portable devices 20 is assigned with an ID code. The memory 32 is stored with the ID code of each portable device 20. The authentication ECU 30 reads out any of the ID codes stored in the memory 32, and includes the ID code in the request signal.

When the authentication ECU 30 receives the response signal from the portable device 20 through the tuner 71, the authentication ECU 30 compares a second challenge code included in the response signal with its own challenge code (hereinafter, ECU challenge code) obtained by a logical operation of the authentication ECU 30. The second challenge code is obtained as the portable device 20 performs a predetermined logical operation to the first challenge code. The ECU challenge code is obtained as the authentication ECU 30 performs a predetermined logical operation to the first challenge code that is transmitted by the authentication ECU 30.

When the second challenge code is authenticated, the authentication ECU 30 turns on the touch sensor 72 to set the touch sensor 72 in a standby state. When the touch sensor 72 detects that the user touches the door handle, the authentication ECU 30 controls the lock device 75 to unlock the door.

When the trigger switch 73 is operated in a condition where the door is closed, the authentication ECU 30 transmits the request signal inside of the passenger compartment through the interior transmitting devices 40 and the request signal outside of the passenger compartment through the exterior transmitting devices 50 so as to confirm whether the user exits from the vehicle 1 with the portable device 20. When it is confirmed that the user exits from the vehicle 1 with the portable device 20, that is, when the authentication is not accessible inside of the passenger compartment, but is accessible outside of the passenger compartment, the authentication ECU 30 controls the lock device 75 to lock the door.

When the push switch 74 is operated, the authentication ECU 30 transmits the request signal inside of the passenger compartment through the interior transmitting devices 40 to confirm whether the portable device 20 is inside of the passenger compartment. When the authentication is accessible, the authentication ECU 30 permits to turn on the accessory power supply and the ignition power supply or instructs the engine ECU 76 to start the engine.

In this case, before transmitting the request signal, the authentication ECU 30 transmits a wake-up signal through the transmitting devices 40, 50 so as to start the portable device 20, which is in the standby state (power-save mode). When the authentication ECU 30 receives a response signal from the portable device 20 in response to the wake-up signal, the authentication ECU 30 transmits the request signal in a manner described above. A process performed by the authentication ECU 30 will be described later in detail.

Next, the portable device 20 will be described.

The portable device 20 is a portable-type wireless communication device carried by the user of the vehicle 1. As described above, the smart entry system may include the plural portable devices 20, such as two portable devices, one corresponding to a master key and the other corresponding to a spare key. FIG. 4 is a circuit diagram illustrating a structure of each portable device 20.

As shown in FIG. 4, the portable device 20 includes a microcomputer 21, a receiving circuit 22, an RSSI circuit 27, an RF transmitting circuit 28, and a battery 29. The receiving circuit 22 receives the radio wave of the request signal transmitted from the transmitting device 40, 50, and demodulates the request signal. The receiving circuit 22 has a similar structure to the receiving circuit 900 shown in FIG. 12. The receiving circuit 22 includes a receiving part 23, an amplifying part 24, a demodulating part 25, and a waveform shaping part 26. The receiving circuit 22 forms a resonance circuit with an antenna coil 231 and a capacitor 232.

The amplifying part 24 amplifies the waveform received from the receiving part 23. The demodulating part 25 performs an envelope-demodulation to the waveform amplified by the amplifying part 24. The waveform shaping part 26 shapes the waveform envelope-demodulated by the demodulating part 25 into a binary signal.

When the antenna coil 231 of the receiving part 23 is electromagnetically coupled to the antenna coil 61 of the transmitting device 40, 50, the ac current according to the waveform of the request signal flows in the receiving part 23. In FIGS. 5A and 5B, (1) illustrates a base-band waveform, that is, a waveform of the request signal, and (2) illustrates a waveform received by the portable device 20, that is, at an output point 233 of the receiving part 23.

As shown in (2) of FIGS. 5A and 5B, an amplitude of the waveform increases according to a high level part of the base-band waveform, and reduces according to a low level part of the base band waveform. It is desirable that the waveform of the output point 233 follows rising and falling of the base-band waveform. In fact, however, the waveform of the output point 233 is slowed due to the influence of the antenna Q value as described above. That is, the amplitude of the waveform received by the portable device 20 does not increase immediately after the base-band waveform turns to the high level, but gradually increases. Likewise, the amplitude of the waveform received by the portable device 20 does not reduce immediately after the base-band waveform turns to the low level, but gradually reduces.

The demodulating part 25 includes a rectifier diode and the like. In FIGS. 5A and 5B, (3) illustrates a waveform at an output point 252 of the demodulating part 25. The waveform shaping part 26 includes a threshold setting circuit 261 and a comparator 263. The threshold setting circuit 261 is a low-pass filter constructed of a resistor and a capacitor. The threshold setting circuit 261 removes a high frequency component from the waveform envelope-demodulated by the demodulating part 25 thereby to moderate the waveform.

In (3) of FIGS. 5A and 5B, dashed lines 941, 942 illustrate a change of a threshold set in the threshold setting circuit 261, that is, a value at an output point 262. A demodulation signal outputted from the demodulating part 25 is inputted to one of input terminals of the comparator 263, and the threshold set by the threshold setting circuit 261 is inputted to the other of the input terminals of the comparator 263.

The comparator 263 outputs a high level signal when the demodulation signal is greater than the threshold value, and outputs a low level signal when the demodulation signal is lower than the threshold value. In FIGS. 5A and 5B, (4) illustrates a waveform at an output point 264 of the comparator 263. An output signal of the comparator 263 is inputted to the microcomputer 21.

Figure 6A:
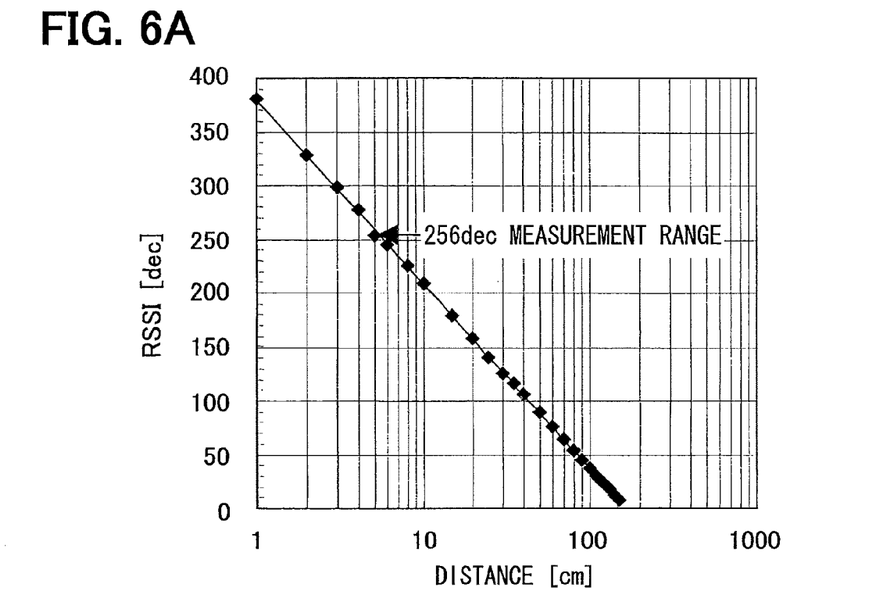
FIG. 6A is a graph illustrating a change of an RSSI value, as a logical value, with respect to a distance between the portable device and the transmitting device.
Figure 6B:
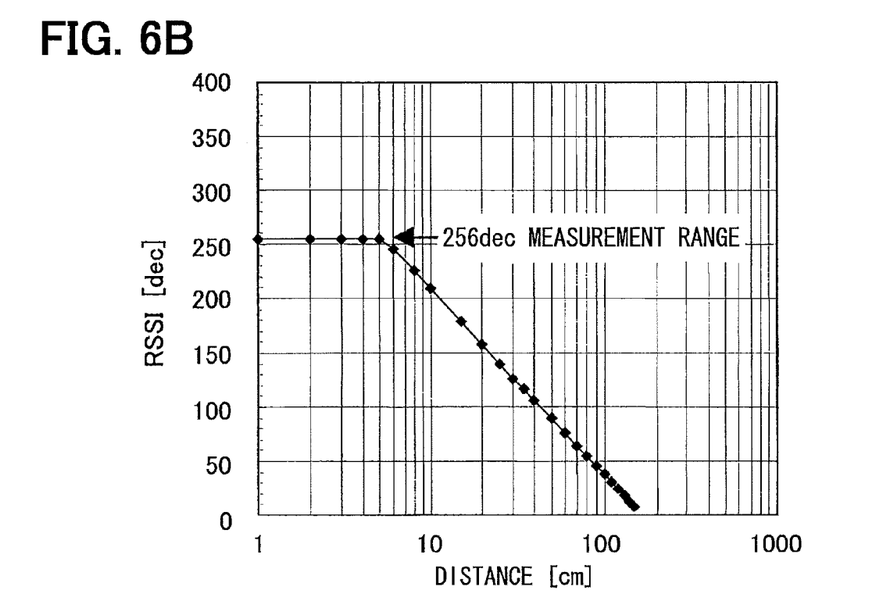
FIG. 6B is a graph illustrating a change of an RSSI value, as a measurement value, with respect to the distance between the portable device and the transmitting device.

The RSSI circuit 27 acquires a signal outputted from the amplifying part 24, and measures an RSSI value (field intensity) of the signal. FIG. 6A and FIG. 6B are graphs illustrating a change of the RSSI with respect to a distance between the portable device 20 and the transmitting device 40, 50 as the transmitting antenna. In particular, FIG. 6A illustrates a theoretical RSSI value, and FIG. 6B illustrates an actual RSSI value measured by the RSSI circuit 27.

As shown in FIG. 6A, the RSSI value theoretically increases with a decrease of the distance. On the other hand, as shown in FIG. 6B, the RSSI value is actually saturated over a measurement range of the RSSI circuit 27. In FIG. 6B, for example, the RSSI value is saturated in a range equal to or higher than 256 dec. The distance between the antenna and the portable device 20 is less than 10 centimeters (cm), in a saturated range. The RSSI value measured by the RSSI circuit 27 is inputted to the microcomputer 21.

The RF transmitting circuit 28 receives a response signal outputted from the microcomputer 21, and modulates the response signal to a signal in an RF band. Further, the RF transmitting circuit 28 transmits the signal modulated.

The microcomputer 21 includes a CPU, a memory and the like. The microcomputer 21 performs a process for the smart entry system. The microcomputer 21 is coupled to the battery 29. The microcomputer 21 is operated by electric power from the battery 29. When the microcomputer 21 is not in operation, the microcomputer 21 switches to a standby state, that is, a power save state.

Figure 7:
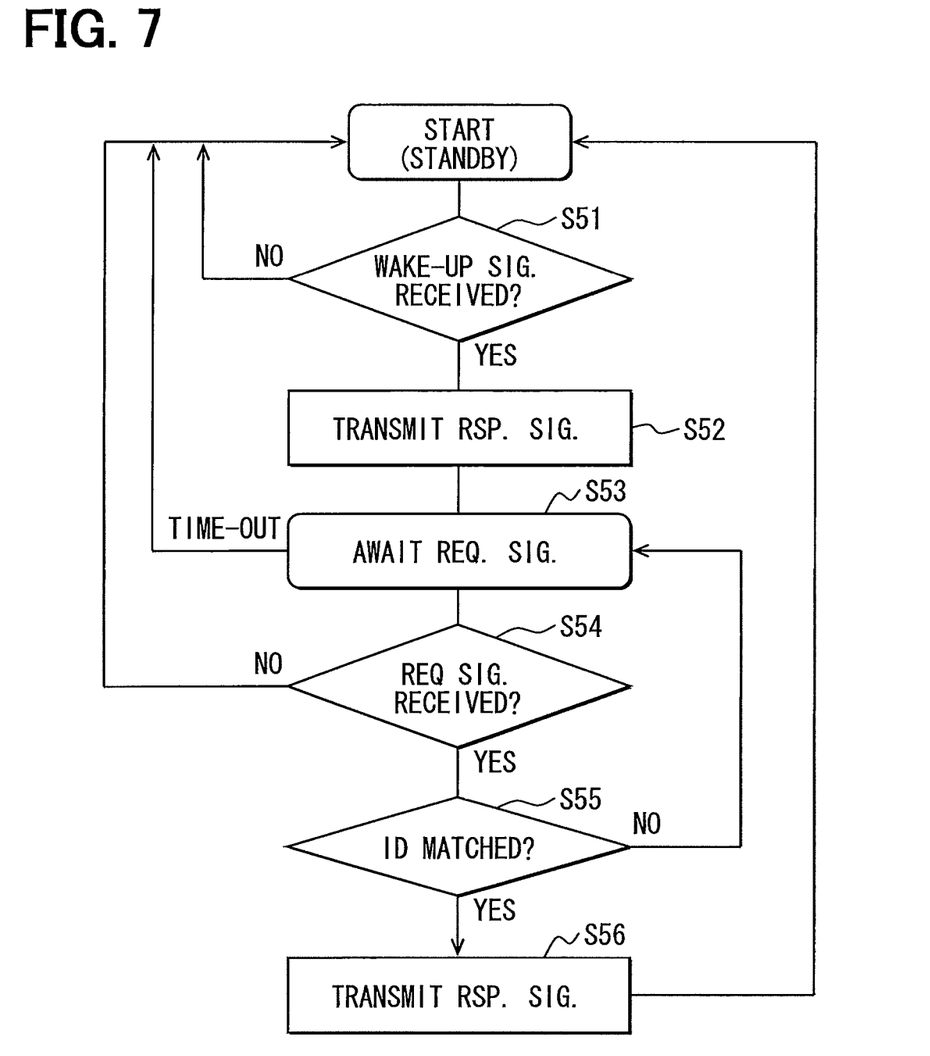
FIG. 7 is a flowchart illustrating a process performed by the portable device according to the embodiment.

FIG. 7 is a flowchart of a process performed by the microcomputer 21. Hereinafter, the process performed by the microcomputer 21 will be described with reference to FIG. 7. It is to be noted that the microcomputer 21 is in the standby state when the process is started.

When the process of FIG. 7 begins, the microcomputer 21 awaits the wake-up signal from the in-vehicle unit 3 (S51). When the microcomputer 21 receives the wake-up signal through the receiving circuit 22 (S51: Yes), the microcomputer 21 switches from the standby state to the normal state and transmits the response signal in response to the wake-up signal (S52).

Next, the microcomputer 21 awaits the request signal from the in-vehicle unit 3 (S53). When the microcomputer 21 does not receive the request signal before a predetermined period of time elapses, that is, before a timeout period, the microcomputer 21 returns to the standby state. When the microcomputer 21 receives a signal before the timeout period, the microcomputer 21 determines whether the signal received is the request signal including the first challenge code and the ID code (S54).

When the signal received is not the request signal (S54: No), the microcomputer 21 returns to the standby state. When the signal received is the request signal (S54: Yes), the microcomputer 21 determines whether the ID code of the request signal matches with an Own ID code of the microcomputer 21 (S55).

When the ID code of the request signal does not match with the own ID code of the microcomputer 21 (S55: No), the process returns to S53. Thus, the microcomputer 21 awaits the request signal including the ID code of the microcomputer 21. The memory of the microcomputer 21 stores the own ID code. Therefore, the microcomputer 21 performs determination of S55 by reading out the own ID code stored in the memory.

When the ID code of the request signal matches with the own ID code of the microcomputer 21 (S55: Yes), the microcomputer 21 generates the response signal and transmits the response signal through the RF transmitting circuit (S56). In particular, the microcomputer 21 performs a predetermined logical operation to the first challenge code of the response signal. The logical operation performed by the microcomputer 21 and the logical operation performed by the authentication ECU 30 in the authentication are set to a common logical operation. The microcomputer 21 outputs the response signal including the second challenge code obtained by the logical operation and the RSSI value of the request signal inputted from the RSSI circuit 27 to the RF transmitting circuit 28 (S56). As such, the response signal including the second challenge code and the RSSI value is transmitted from the RF transmitting circuit 28. After the step of S56, the microcomputer 21 returns to the standby state.

Next, a process performed by the authentication ECU 30 will be described in detail.

Figure 8:
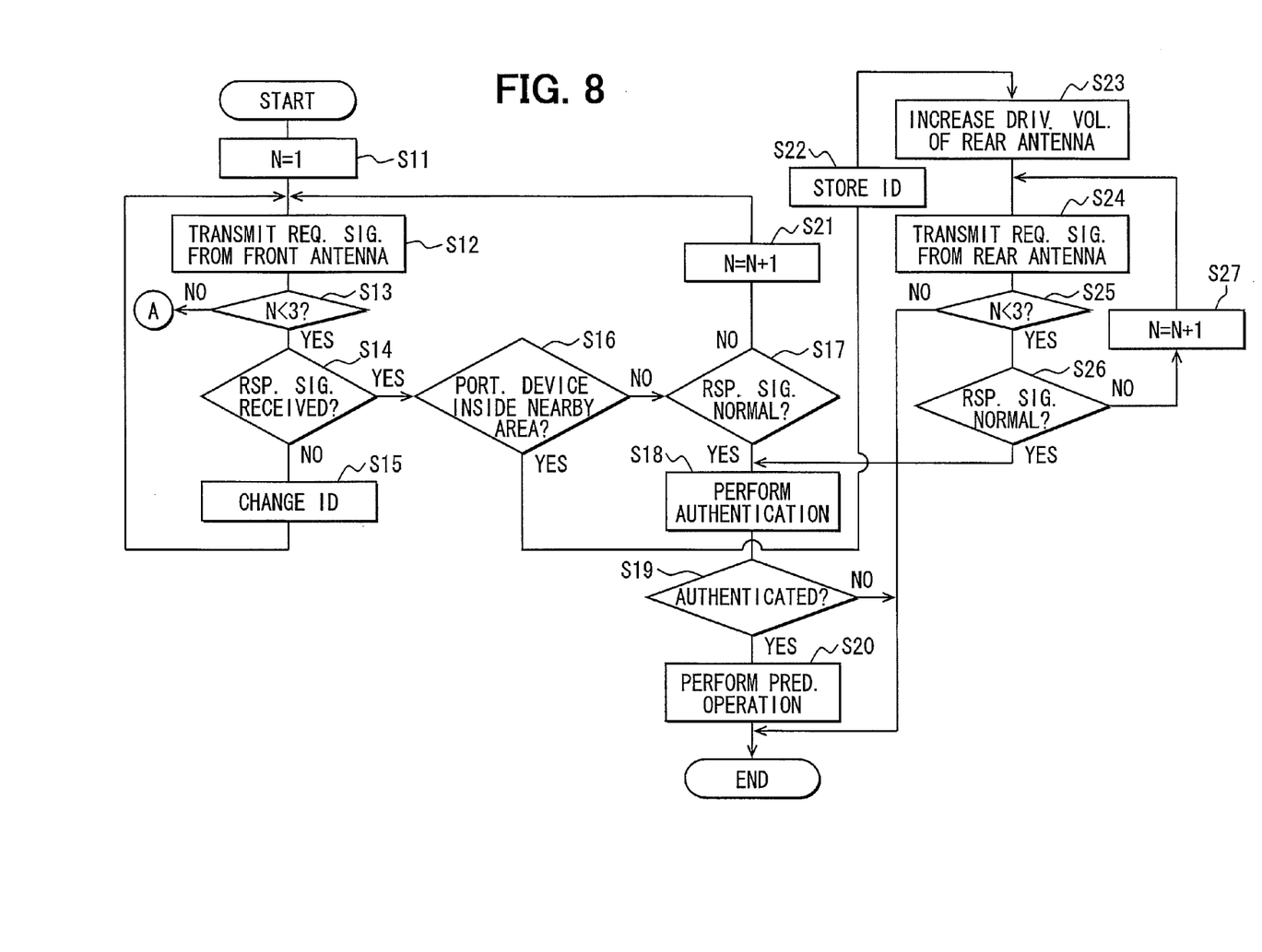
FIG. 8 is a flowchart illustrating a process performed by an authentication ECU of the wireless communication system according to the embodiment.
Figure 9:
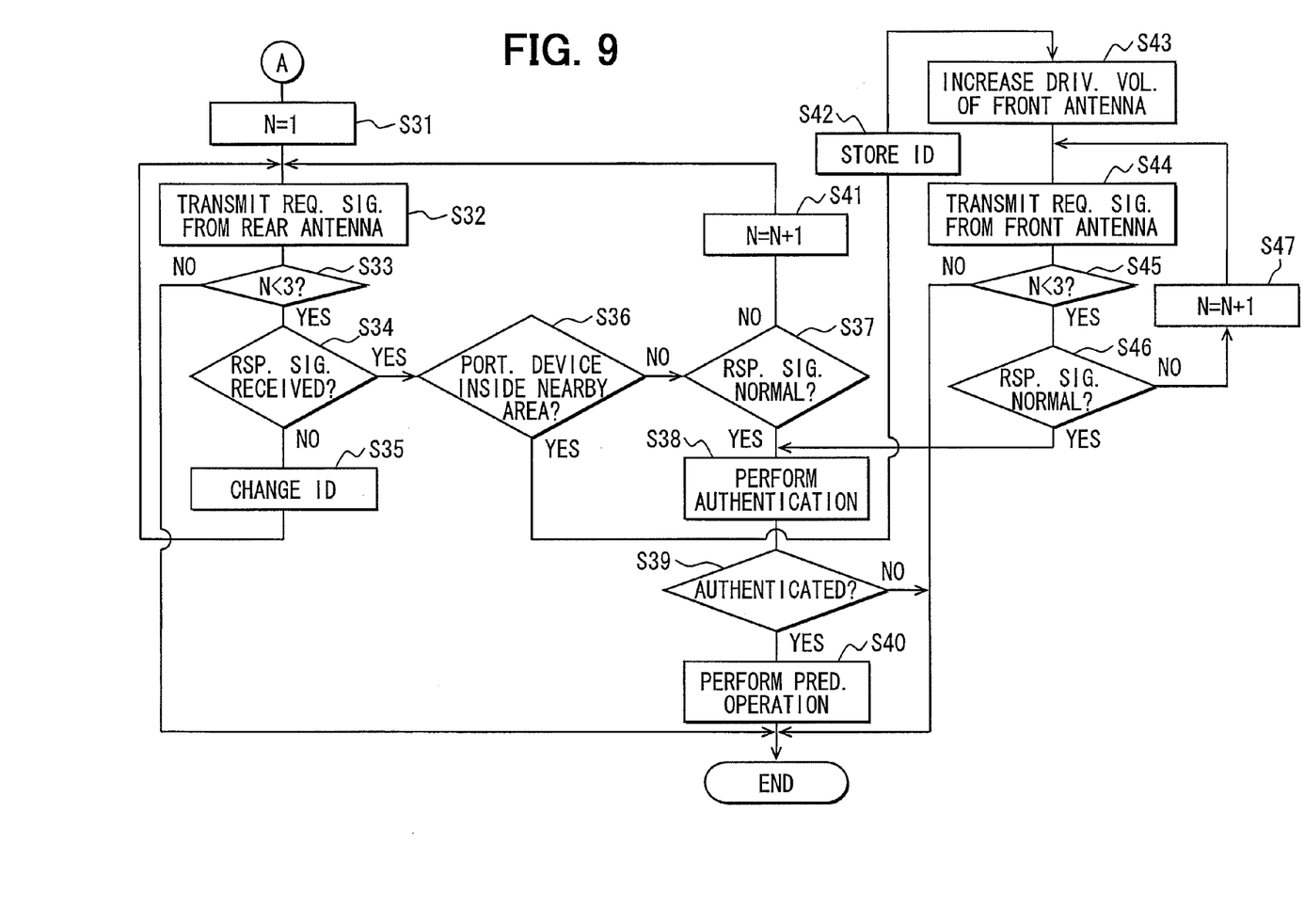
FIG. 9 is a flowchart illustrating a process subsequent to the process shown in FIG. 8.

FIGS. 8 and 9 are flowcharts illustrating a process performed by the authentication ECU 30. In the process shown in FIGS. 8 and 9, it is assumed that the request signal is transmitted from the interior transmitting device 40. For example, the process shown in FIG. 8 begins when the push switch 74 is operated for instructing an engine start.

When the process shown in FIG. 8 begins, the authentication ECU 30 sets the number of transmission time N of the request signal to "1", that is, resets the number of transmission time N (S11). Next, the authentication ECU 30 transmits the request signal including the command, the first challenge code and the ID code through the front interior transmitting device 41 (S12). In this case, the authentication ECU 30 designates any one of the ID codes for the portable devices 20 stored in the memory 32, and includes the ID code designated in the request signal (S12).

Next, the authentication ECU 30 determines whether the number of transmission time N is less than a predetermined number (for example, "3" in FIG. 8) (S13). When the number of transmission time N is less than the predetermined number (S13: Yes), the authentication ECU 30 determines whether the response signal from the portable device 20 is received (S14). When the response signal from the portable device 20 is not received (S14: No), the authentication ECU 30 changes the ID code to be included in the request signal (S15) and performs steps of S12-S14 described above.

When the response signal from the portable device 20 is received (S14: Yes), the authentication ECU 30 determines whether the portable device 20 is inside of a nearby area 412 of the front interior transmitting device 41 based on the RSSI value included in the response signal received (S16). In this case, the nearby area 412 is defined around the front interior transmitting device 41 and is smaller than the front communication area 411, in particular, around the antenna coil 61 of the front interior transmitting device 41.

The nearby area 412 is defined as an area where the request signal is less likely to be properly received by the portable device 20, such as an area where the demodulation waveform is likely to miss a bit as shown in (4) of FIG. 5B when the portable device 20 receives the request signal transmitted from the transmitting device located in the nearby area 412, or an area where the RSSI value measured by the portable device 20 is likely to be over a measurement range as shown in FIG. 6B. For example, the nearby area 412 is defined in an area approximately 10 cm from the front interior transmitting device 41.

In S16, a threshold of the RSSI value for discriminating inside and outside of the nearby area 412 is set beforehand. When the RSSI value included in the response signal is greater than the threshold, the authentication ECU 30 determines that the portable device 20 is inside of the nearby area 412 (S16). When the RSSI value included in the response signal is less than the threshold, the authentication ECU 30 determines that the portable device 20 is outside of the nearby area 412 (S16). For example, when the nearby area 412 is defined within 10 cm from the antenna, the threshold of the RSSI value is approximately 200 dec, as shown in FIG. 6B.

In S16, when the portable device 20 is outside of the nearby area 412 (S16: No), the authentication ECU 30 determines whether the response signal received is normal, that is, the response signal does not have an error such as the bit missing in S17. When the response signal does not have an error (S17: Yes), the authentication ECU 30 authenticates whether the second challenge code included in the response signal corresponds to the ECU challenge code (S18).

When the second challenge code of the response signal is authenticated (S19: Yes), the authentication ECU 30 permits a predetermined operation, such as the engine start (S20). When the second challenge code of the response signal is not authenticated (S19: No), the authentication ECU 30 directly terminates the process of FIG. 8.

In S17, when the response signal has an error (S17: No), the authentication ECU 30 add "1" to the number of transmission time N (S21), and returns to S12. In this case, the authentication ECU 30 assigns the ID code of the same portable device 20 to the request signal, and transmits the request signal (S12).

Figure 10:
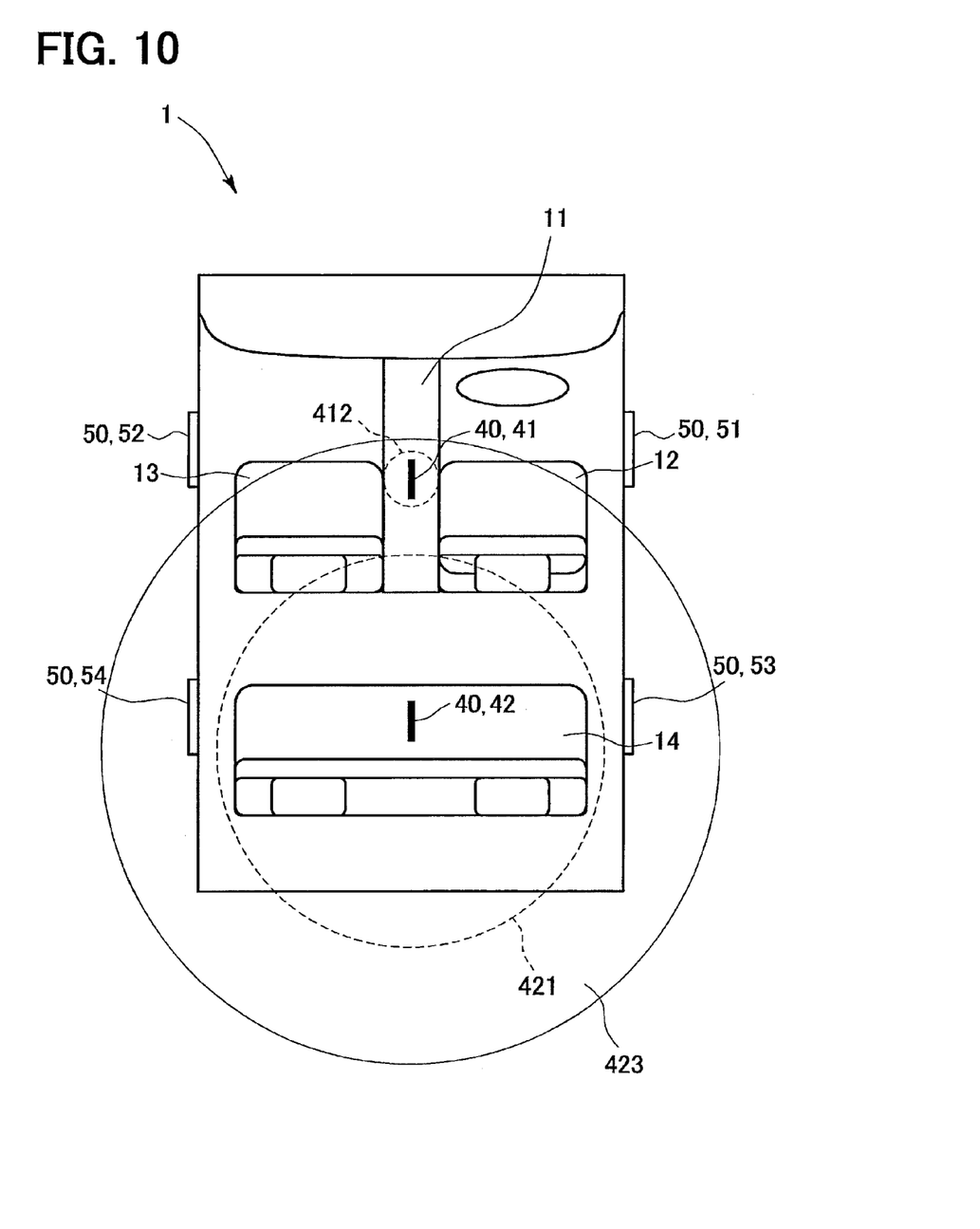
FIG. 10 is a diagram illustrating a change of a communication area of a rear interior transmitting device according to the embodiment.

In S16, when the portable device 20 is inside of the nearby area 412 (S16: Yes), the authentication ECU 30 stores the ID code of the portable device 20 designated in this transmission time as the ID code to be included in a next request signal (S22). Next, the authentication ECU 30 controls the regulator 64 of the rear interior transmitting device 42 to increase the driving voltage of the antenna coil 61 of the rear interior transmitting device 42 such that the communication area of the rear interior transmitting device 42 is increased from an original communication area 421, as shown by a dashed line in FIG. 10, to a communication area 423, as shown by a solid line in FIG. 10, encompassing the nearby area 412 (S23). As a result of increasing the driving voltage, the communication area 423 expands to outside of the passenger compartment.

Next, the authentication ECU 30 retransmits the request signal through the rear interior transmitting device 42 (S24). In this case, the ID code stored in S22 is included in the request signal retransmitted. As such, the request signal transmitted from the rear interior transmitting device 42 can be received by the portable device 20 located inside of the nearby area 412 of the front interior transmitting device 41. In this case, the front interior transmitting device 41 corresponds to a nearby antenna, and the rear interior transmitting device 42 corresponds to a distant antenna.

Accordingly, the portable device 20 can properly receive the request signal, and the RSSI value can be accurately measured. Further, even if the communication area 423 expands outside of the passenger compartment, it is less likely that another portable device 20 outside of the passenger compartment will respond to the request signal.

Next, the authentication ECU 30 determines whether the number of transmission time N is less than the predetermined number (for example "3" in FIG. 8) (S25). When the number of transmission time N is less than the predetermined number (S25: Yes), the process returns to S26.

In this case, the authentication ECU 30 receives the response signal from the portable device 20 located inside the nearby area 412 of the front interior transmitting device 41. Therefore, in S26, the authentication ECU 30 determines whether the response signal received is normal, that is, the response signal received does not have an error.

When the response signal has no error (S26: Yes), the authentication ECU 30 performs the steps of S18-S20. When the response signal has an error (S26: No), the authentication ECU 30 adds "1" to the number of transmission time N (S27), and retransmits the request signal (S24). In S25, when the number of transmission time N exceeds the predetermined number (S25: No), the authentication ECU 30 terminates the process of FIG. 8.

In S13, when the number of transmission time N exceeds the predetermined number (S13: No), the authentication ECU 30 considers that there is no portable device 20 in the communication area 411 of the front interior transmitting device 41 and proceeds to the process for the rear interior transmitting device 42 of FIG. 9.

The process shown in FIG. 9 is similar to the process shown in FIG. 8. Therefore, a description of similar steps will not be repeated. In the process shown in FIG. 9, the number of transmission time N is reset (S31), and transmits the request signal from the rear interior transmitting device 42 (S32).

When the authentication ECU 30 receives the response signal from the portable device 20 (S34: Yes), the authentication ECU 30 determines whether the portable device 20 is inside of a nearby area 422 of the rear interior transmitting device 42 (S36). When the portable device 20 is inside of the nearby area 422 (S36: Yes), the authentication ECU 30 increases the driving voltage of the front interior transmitting device 41 such that the communication area 411 is increased to encompass the nearby area 422 (S43), and retransmits the request signal from the front interior transmitting device 41 (S44).

As such, the portable device 20 can receive the request signal from the front interior transmitting device 41. In this case, the rear interior transmitting device 42 corresponds to the nearby antenna, and the front interior transmitting device 41 corresponds to the distant antenna.

In the present embodiment described above, even if the portable device 20 is located near the transmitting antenna, the portable device 20 can properly receive the request signal. Namely, even if the portable device 20 is located near one of the transmitting antennas (nearby antenna), since the request signal is transmitted from another one of the transmitting antennas (distant antenna) while increasing the communication area of the another one of the transmitting antennas, the portable device 20 can properly receive the request signal transmitted from the another one of the transmitting antennas. As such, the smart entry system can properly function. In addition, since the portable device 20 can accurately measure the RSSI value, the system employing the RSSI value can properly function. For example, a system that restricts a relay attack, as described in the patent citation 2, will be properly operated.

Also, in the case where the request signal including the ID code of the portable device 20 located inside of the nearby area is retransmitted from the another one of the transmitting antenna (distant antenna), it is less likely that another portable device will respond to the request signal.

The wireless communication system according to the present disclosure will not be limited to the embodiment described above, but may be modified in various other ways without departing from the scope of the appended claims.

Figure 11:
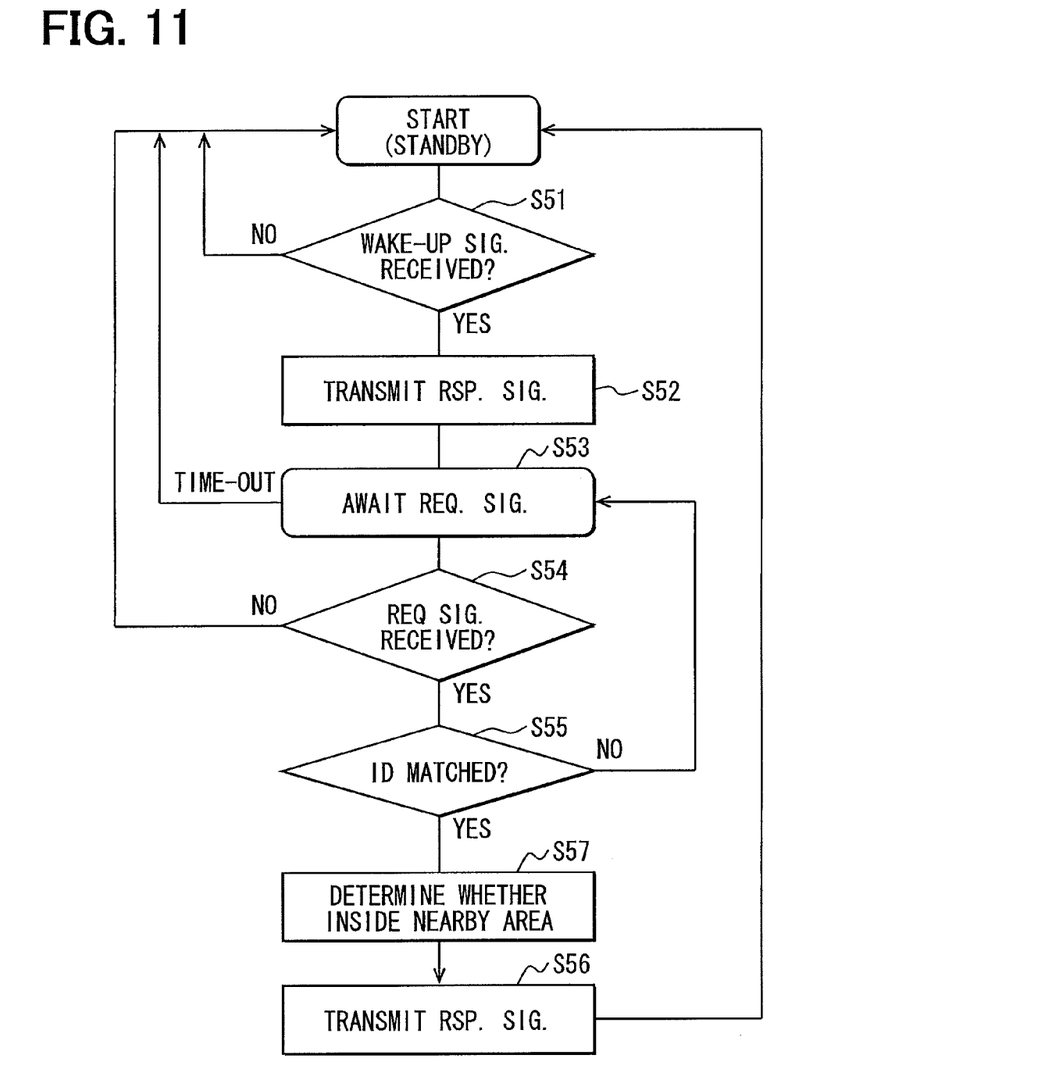
FIG. 11 is a flowchart illustrating a process performed by an authentication ECU of a wireless communication system according to another embodiment.

For example, the wireless communication system may be configured such that the portable device 20 self-determines whether it is located inside of the nearby area of the transmitting antenna based on the RSSI value. In such a case, the portable device 20 performs a process shown in a flowchart of FIG. 11, for example. In FIG. 11, steps similar to the steps of FIG. 7 are designated with the same reference numbers.

As shown in FIG. 11, when the ID code of the request signal received matches with its own ID code of the portable device 20 (S55: Yes), the portable device 20 determines whether it is inside of the nearby area of the transmitting antenna based on the RSSI value measured (S57). When the portable device 20 determines that it is inside of the nearby area, the portable device 20 includes information (nearby information) notifying that the portable device 20 is inside of the nearby area in the response signal to be transmitted in S56.

When the portable device 20 is not inside of the nearby area of the antenna, the portable device 20 transmits a normal response signal in S56. For example, when the RSSI value is used in the in-vehicle unit 3 for another purpose, the portable device 20 transmits a normal response signal including the RSSI value. When the RSSI value is not used in the in-vehicle unit 3 for other purposes, the portable device 20 transmits a normal response signal without including the RSSI value. In the in-vehicle unit 3, that is, in the authentication ECU 30, in S16 of FIG. 8 and S36 of FIG. 9, it is determined whether the portable device 20 is inside of the nearby area of the transmitting antenna based on whether the response signal received includes the nearby information. Also in this case, an advantageous effect similar to the embodiment described above will be achieved.

In the embodiments described above, it is determined whether the portable device 20 is near the transmitting antenna based on the RSSI value of the request signal. As another example, it may be determined whether the portable device 20 is near the transmitting antenna based on the RSSI value of the wake-up signal that is transmitted prior to the request signal. In such a case, the response signal transmitted in S52 of FIG. 7 may include the RSSI value of the wake-up signal.

In the embodiments described above, the present disclosure is exemplarily applied to the interior transmitting device. Further, the present disclosure may be applied to the exterior transmitting device. For example, when the portable device 20 is inside of the nearby area of the interior transmitting device 40, the communication area of the external transmitting device 50 may be expanded to encompass the nearby area. For example, when the portable device 20 is inside of the nearby area of the exterior transmitting device 50, the communication area of the interior transmitting device 40 or the communication area of another exterior transmitting device 50 may be expanded to encompass the nearby area.

For example, it may be determined whether the portable device 20 is near the transmitting antenna by a method using other than the RSSI value. For example, a camera may be disposed in the vehicle 1 to capture an image of a nearby area of the transmitting antenna, and it may be determined whether the portable device 20 is near the transmitting antenna based on an image photographed by the camera.

As another example, the transmitting device 40, 50 may have a function of receiving a radio wave from the portable device 20, and it may be determined whether the portable device 20 is near the transmitting antenna based on an intensity of the radio wave.

The present disclosure may be applied to a wireless communication system other than the smart entry system. For example, the present disclosure may be applied to a system that transmits signals to a portable device from plural transmitting antennas disposed at different positions of a vehicle.

In the embodiments described above, the transmitting devices 40, 50 correspond to a transmitting antenna. The authentication ECU 30 corresponds to a transmission control section. The section or element of the authentication ECU 30 performing S16 of FIG. 8 and S36 of FIG. 9 corresponds to an approach determination section. The RSSI circuit 27 corresponds to a signal intensity measurement section. The tuner 71 corresponds to a receiving section. The section or element of the microcomputer 21 performing S57 of FIG. 11 corresponds to a portable device determination section. The memory 32 corresponds to a storage section. The section or element of the authentication ECU 30 performing the step of S22 of FIG. 8 and the step of S42 of FIG. 9 corresponds to an identification information designation section. The signal transmitted from the transmitting device 40, 50, such as the wake-up signal and the request signal, corresponds to a primary signal. The response signal transmitted from the portable device 20, such as the response signal responding to the wake-up signal, corresponds to a secondary signal. The ID code of the portable device 20 corresponds to an identification information.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

The invention claimed is:

1. A wireless communication system comprising:
    a plurality of transmitting antennas being disposed at different positions of a vehicle, each of the transmitting antennas transmitting a primary signal to a communication area according to a driving voltage thereof;
    a portable device receiving the primary signal when the portable device is inside of any of the communication areas;
    a transmission control section being integrated to the vehicle and controlling the driving voltage of each of the transmitting antennas; and
    an approach determination section being integrated to the vehicle and determining whether the portable device is inside of a nearby area of one of the transmitting antennas transmitting the primary signal, wherein
    when the approach determination section determines that the portable device is inside of the nearby area, the transmission control section changes the driving voltage of another one of the transmitting antennas disposed outside of the nearby area of the one of the transmitting antennas such that the communication area of the another one of the transmitting antennas is increased to encompass the nearby area of the one of the transmitting antennas and the primary signal is retransmitted from the another one of the transmitting antennas.

2. The wireless communication system according to claim 1, wherein
    the portable device includes a signal intensity measurement section that measures an intensity of the primary signal that the portable device receives, and
    when the portable device receives the primary signal, the portable device transmits a second signal to the vehicle, the second signal indicating the intensity of the primary signal measured by the signal intensity measurement section,
    the wireless communication system further comprising a receiving section being integrated to the vehicle and receiving the secondary signal, wherein
    the approach determination section determines whether the portable device is inside of the nearby area based on the intensity of the primary signal indicated by the secondary signal.

3. The wireless communication system according to claim 1, wherein
    the portable device includes a signal intensity measurement section that measures an intensity of the primary signal that the portable device receives, and a portable device determination section that determines whether the portable device is inside of the nearby area based on the intensity of the primary signal measured by the signal intensity measurement section,
    when the signal intensity measurement section determines that the portable device is inside of the nearby area, the portable device transmits a secondary signal to the vehicle, the secondary signal including an approach information indicating that the portable device is inside of the nearby area,
    the wireless communication system further comprising a receiving section being integrated to the vehicle and receiving the secondary signal, wherein
    the approach determination section determines that the portable device is inside of the nearby area when the receiving section receives the secondary signal including the approach information.

4. The wireless communication system according to claim 2, wherein
    the portable device is one of a plurality of portable devices, and each of the plurality of portable devices is provided with an identification information for identifying each portable device,
    the wireless communication system further comprising:
    a storage section being integrated to the vehicle and storing the identification information of each of the portable devices; and
    an identification information designation section being integrated to the vehicle and designating any of the identification informations stored in the storage section, wherein
    the transmission control section transmits the primary signal including the identification information designated by the identification information designation section,
    the portable device transmits the secondary signal only when the identification information included in the primary signal matches with the identification information provided to the portable device, and
    when the transmission control section retransmits the primary signal from the another one of the transmitting antennas, the identification information designation section designates the identification information of the portable device located inside of the nearby area.

5. The wireless communication system according to claim 1, wherein the nearby area is a predetermined area defined around the one of the transmitting antennas and being smaller than the communication area of the one of the transmitting antennas.

* * * * *